E. P. DU PONT.
IGNITER.
APPLICATION FILED MAR. 25, 1909.
991,364. Patented May 2, 1911.
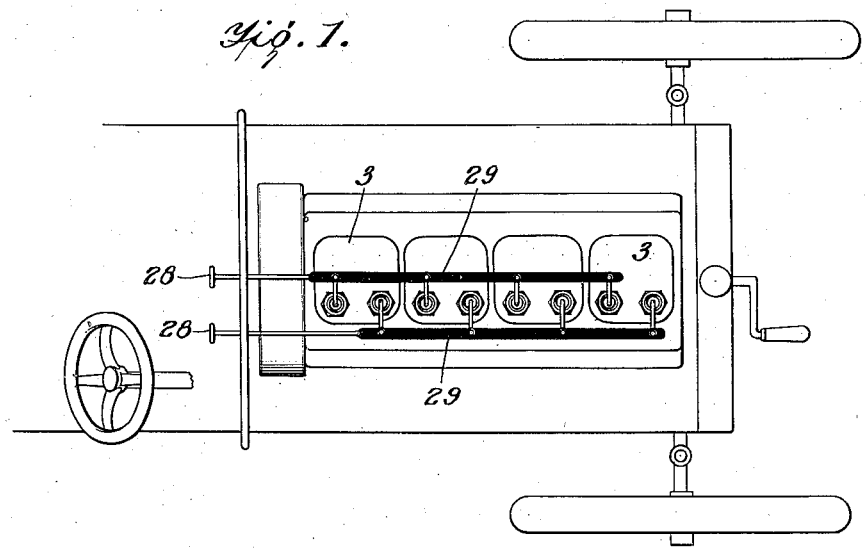
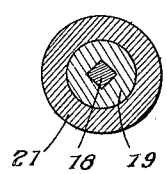
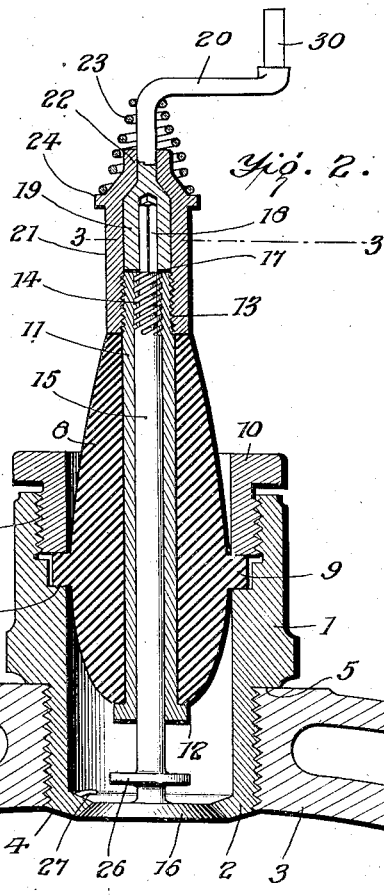
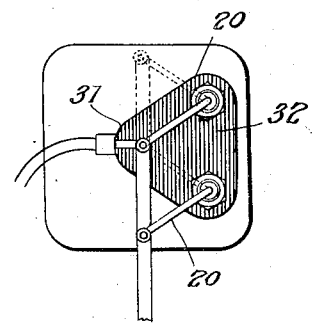
WITNESSES
L. H. Schmidt
C. E. Trainer
INVENTOR
ELEUTHERE PAUL DU PONT,
BY Munn & Co.
ATTORNEYS

UNITED STATES PATENT OFFICE.

ELEUTHERE PAUL DU PONT, OF MONTCHANIN, DELAWARE.

IGNITER.

991,364.

Specification of Letters Patent.  Patented May 2, 1911.

Application filed March 25, 1909.  Serial No. 485,623.

*To all whom it may concern:*

Be it known that I, ELEUTHERE PAUL DU PONT, a citizen of the United States, and a resident of Montchanin, in the county of Newcastle and State of Delaware, have invented certain new and useful Improvements in Igniters, of which the following is a specification.

My invention is an improvement in igniters, and consists in certain novel constructions and combinations of parts hereinafter described and claimed.

Referring to the drawings forming a part hereof Figure 1 is a diagrammatic plan view of the improvement. Fig. 2 is a longitudinal section of the igniter proper. Fig. 3 is a section on the line 3—3 of Fig. 2 and Fig. 4 is a plan view with the plugs arranged to use with a single ignition system.

In the present embodiment of the invention, the plug comprises a ferrule or casing 1, having a reduced portion 2 externally screw threaded for engaging the threaded opening of the cylinder 3, and the lower end of the ferrule is reduced as at 4 to form a valve seat for a purpose to be presently described.

A shoulder 5 is formed at the junction of the reduced portion with the body of the ferrule, which shoulder engages the face of the cylinder, and near the upper end of the ferrule an internal annular shoulder 6 is provided, the ferrule being internally screw threaded above the shoulder as at 7, and an insulating bushing 8 is provided with an annular flange 9 which rests upon the shoulder 3, and is engaged by a nut 10 engaging the threaded portion 7 of the casing, the inner end of the nut resting against the flange.

A tube 11 is arranged within the bushing, the lower end of the tube being provided with an annular flange 12 against which the bushing rests and the upper end being externally screw threaded as at 13 and internally threaded as at 14. A stem or electrode rod 5 is movable longitudinally of the tube, the lower end of the stem being provided with a valve 16 engaging the seat before mentioned, while the upper end is screw threaded as at 7 for engaging the threads 14 of the tube. The free end of the stem is squared as at 18, and is engaged by a socket 19 on the end of a crank 20.

A cap 21 incloses the socket, the lower end of the cap being threaded on to the end of the tube, and the upper end is shaped to fit above the socket being contracted to engage the crank as at 22. A coil spring 23 is arranged between the crank and a flange 24 on the cap. The spring 23 retains the socket closely in contact with the reduced portion of the cap to prevent the escape of gases through the tube, and the screw threads 14 and 17 of the stem and the tube respectively are coarse as shown, so that a slight rotation of the stem will move the same a considerable distance longitudinally. The lower end of the stem above the valve is provided with an annular flange 26 forming one of the sparking points, and a spur 27 on the inner face of the casing forms the other.

It will be evident from the description, that when the crank is turned the stem will be constrained to turn therewith and will also move longitudinally to move the valve from its seat. This movement brings the flange 26 into sparking distance of the point 27, and the interior of the casing is placed into communication with the interior of the cylinder.

In the construction shown in Fig. 1, each cylinder is provided with two plugs and either set may be made use of by manipulating the handles 28, which are connected to links 29 of an insulating material, the handle portion 30 of the cranks being journaled in the links. It will be understood that each of the sparking plugs shown in Fig. 1 is constructed in accordance with the plug shown in Fig. 2, and by closing the valves of the set not in use, such set will be perfectly protected from the products of combustion, and from the intense heat of the combustion chamber.

In Fig. 4 the plugs are shown for use with a single ignition system, the terminals of the system being connected with the contact point 31 on the insulated block 32 and with the cylinder. The point 33 of the switch is adapted for contact with either crank arm 20 whereby to complete the connection.

The construction of the plugs shown in Fig. 4 is precisely the same as that shown in Fig. 2, and it will be evident that by moving the rod 34 in either direction, one of the arms 20 will be engaged by the point 33. With this construction, either plug may be connected with the ignition system, while the other is closed.

I claim:

1. A sparking plug comprising a substantially cylindrical casing for screwing into a cylinder, the inner end of the casing being formed into a valve seat, a longitudinally movable rod mounted in the casing and having a valve for coöperating with the said seat to shut off the casing from the cylinder, said rod being threaded near its upper end, and squared above the threaded portion, an insulating bushing arranged between the rod and the casing, a tube within the bushing and in which the rod is journaled, said tube having a threaded portion for engagement by the threaded portion of the rod, the rod having an annular rib adjacent to the valve forming one of the sparking points of the plug, the casing being provided with another point within the same, a cap connected with the tube and inclosing the end of the rod, a crank arm journaled in the end of the cap and provided with a socket for engaging the squared end of the rod, and a spring encircling the crank arm and engaging the cap for the purpose set forth.

2. A device of the class described, comprising a casing for screwing into a cylinder, the inner end of the casing being formed into a valve seat, a longitudinally movable rod mounted in the casing, said rod having on its inner end a valve for coöperating with the seat to shut off the casing from the cylinder, one of the sparking points of the plug being on the rod adjacent to the valve and the other on the casing above the valve, said rod having a threaded portion, an insulating bushing for the rod, a tube within the bushing and having a threaded portion for engagement by the rod, and means for rotating the rod.

3. A sparking plug comprising a casing for screwing into a cylinder, a valve for closing the communication between the casing and the cylinder, a rod in the casing and insulated therefrom, one of the sparking points of the plug being connected with the casing and inside thereof, and the other on the rod within the casing and separated from the first named point when the valve is closed, said rod having a threaded portion, a tube within which the rod is journaled and having a threaded portion coöperating with the threaded portion of the rod, and means for rotating the rod.

4. In a device of the class described, a plurality of series of plugs, each plug comprising a casing, a valve for closing the same, a spring normally retaining the valve closed, the sparking points of the plug being within the casing and connected therewith and with the valve respectively, and means for simultaneously opening the valves of either series.

5. An auxiliary spark plug comprising a hollow holder provided with an end wall in which a port is formed, and a spark plug insulator mounted in said holder and provided with an adjustable electrode rod carrying a member which closes the port when the plug is not in use.

ELEUTHERE PAUL DU PONT.

Witnesses:
ISADORE MERZBACHER,
MARY E. LOGAN.